Aug. 20, 1929.                W. M. SCHOLL                 1,725,021
             METHOD AND MEANS FOR MEASURING THE HUMAN FEET
                         Filed Dec. 1, 1924
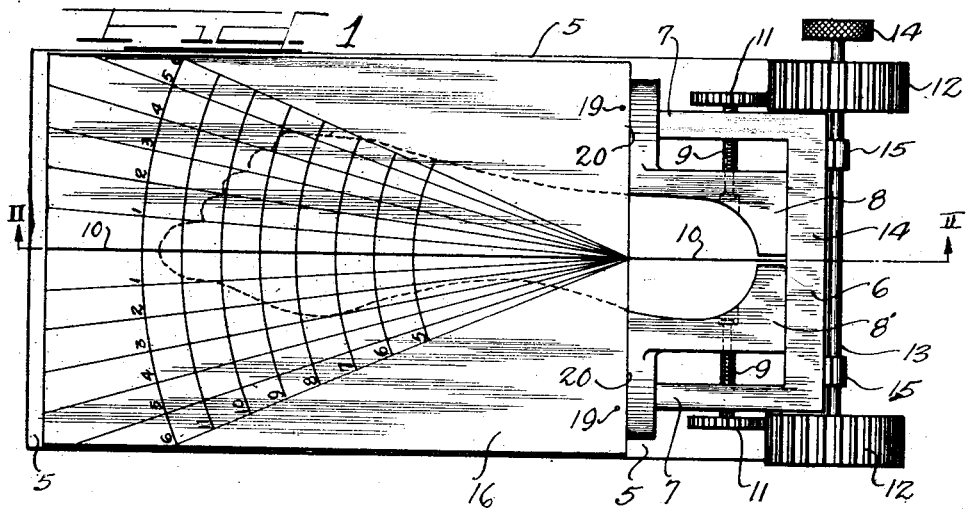

Patented Aug. 20, 1929.

1,725,021

UNITED STATES PATENT OFFICE.

WILLIAM M. SCHOLL, OF CHICAGO, ILLINOIS.

METHOD AND MEANS FOR MEASURING THE HUMAN FEET.

Application filed December 1, 1924. Serial No. 753,327.

The invention relates to a method and means for measuring the human foot.

One of the objects is to provide a novel means of measuring and recording the measurement of the human foot.

Another object of the invention is to provide means for measuring the length, breadth, and swing of the foot.

Another object is to provide a chart upon which the outline of the foot may be marked or delineated.

Another object is to provide means whereby a chart depicting the characteristics of either foot may be made.

Another object is to provide means whereby the elongation and expansion of the foot by weight imposed thereon may be indicated on the chart.

Another object is to provide a chart of the foot which will serve as a guide for the last-maker and for the shoemaker.

Another object is generally to improve methods and devices of this character, and to improve charts made by said devices.

Other objects, advantages and benefits of the invention will become apparent, to persons skilled in the art, from a consideration of the following description when taken in conjunction with the drawings wherein:

Figure 1 is a plan view, of the chart-making device with a chart thereon and showing the outlines of the foot in broken lines on the chart.

Figure 2 is a section on line II—II of Figure 1.

Figure 3 is a chart before being used.

In all the views the same reference characters are used to indicate similar parts.

There is such a wide divergence in the character of feet of different individuals, and in the feet of the same individual, that the greatest caution and care should be observed in the delineation of a chart for recording the formation or malformation and other peculiarities of the feet.

Such a chart should be used as a guide to the last maker and for the information of the shoemaker.

In making such a chart it is necessary to take into consideration the fact that nearly every adult person has deformed feet, as a result of wearing poorly designed and improperly fitted shoes from childhood, and after they have reached mature or adult age, when development is complete, it becomes quite difficult to quickly effect any alteration or change of formation of the skeleton of the foot.

In designing shoes, the first thing of importance to do is to depict, as nearly as possible, the outline of the foot for which the shoe is intended in order that the last may be made to substantially conform to the configuration of the particular foot.

For foot correction purposes it is well to depart slightly from the particular outline of the chart towards that of a normal foot, allowing some tolerance of small variations for the comfort of the wearer and decreasing this tolerance in subsequently designed shoes for the same person in order that the foot may be gradually brought back or into its normal or natural condition.

The device to be hereinafter described contemplates means for holding the os-calcis or heel bone of the foot, by clamping it equally on each of its sides and holding it in its natural position and then outlining the anterior portion of the foot on a suitable chart, which serves as a guide for the construction of a shoe to be made for the particular foot depicted on the chart. By this means and by use of a datum line the relation of the anterior and posterior portions of the foot may be ascertained and defined upon a chart by tracing the outlines of the foot upon the chart with a lead pencil, stylus or the like.

One embodiment of this invention is shown in the drawings in which the flat plate 5 carries an upstanding U-shaped part 6. Between the leg members 7—7 of the U-shaped block are slidable clamping members 8—8'. The clamping members are made to slide in a single transverse plane towards and from each other, and are intended to clamp and hold the heel or the os-calcis of the foot in its natural position. It is quite important that the clamping members 8—8' should have the same extent of travel or excursion on the respective sides of the datum line, or Meyer's line, 10. In order that the clamping member 8—8' may be moved at the same time and to the same extent I have provided screw-shafts or stud bolts 9 which pass through the legs 7—7 of the U-shaped member and loosely engage the respective clamping members 8—8' so that when these screws are rotated the clamping members will be simultaneously moved toward or from the line 10.

To facilitate the movement described I place on each end of the screw-shafts 9—9 a gear wheel 11—11 which is in mesh with an elongated gear wheel 12—12. The gear wheels 12 are secured to the respective ends of the shaft 13 which may be rotated by the knurled nut or thumb piece 14. The shaft 13 has bearings on the yoke 16 of the U-shaped piece, at 15.

The Meyer's line, or datum line 10, extends from the back of the heel portion at the point where the clamping members 8—8' meet, when they are moved toward each other as much as can be, to the front end of base 5 and will pass through the center of the heel and preferably through the center of the great toe of either foot, of a normal foot. It is of course evident that this line may be established in different locations, as for example, between the great toe and the second toe or at any other location that may be desirable in accordance with the ideas of the maker, but in all instances it should be stable in its position on the measuring instrument and on the chart that is to be used in connection therewith.

The chart 16 is made, preferably, of cardboard and is provided with holes 17, near its edge 18 to overlie pins 19 extending from the plate 5. This will bring the edge 18 of the chart in line with the front faces of the clamp extended members 20, and the openings 17 and the pins 19 are so related that the datum line of the chart 16 will register with the datum line 10 of the instrument so that the datum line of the chart and of the instrument are in the same vertical plane.

Projecting from the edge 18 and at the end of the datum line 10 of the chart, a series of radially extending, spaced lines on either side of the datum, or Meyer's line 10, radiate from this point and are spaced the same distances apart, are indicated by reference characters one to seven or eight inclusive. These lines are for the purpose of indicating the distance of the outline of the foot upon either side of the datum line and when taken together they indicate the width of the foot at the various points where they intersect the outline of the foot. If the great toe is shown on the right of the datum line, the foot swings to the right with respect to the person's body and if it is on the left of the datum line it swings to the left.

Another set of lines, arcuate in shape are drawn from the focal point shown, where the datum line and the edge 18 of the chart are bisected. By these arcuate lines the length of the foot may be determined in fractions of an inch, by arbitrary shoe numbering or in accordance with the metric scale.

The radial lines indicated by reference numerals 1 to 8 inclusive may in practice be indicated by the size markings of the shoe such as A, B, C, and so forth. As the measurements shown upon the chart are actual the dimensions may also be readable in figures or the like.

The chart is placed upon the instrument with the holes 17 over the pins 19 with the datum lines coinciding. The clamp members 8 are then opened so that the heel of the foot may be caused to enter the space enclosed by the clamps. The thumb nut 14 is then turned until the clamp members approach each other to contact firmly with the heel of the foot but not to an extent, to be painful to the person whose foot is being measured. When the foot is in place and the weight of the body is superposed thereon a pencil or stylus is used to trace the outlines of the foot upon the chart. The form of the tracing will indicate the location of the great toe with respect to the datum line 10 and will show the inner or outer swing, the length and width of the foot. The length of the shoe may be estimated from the location of the point where the first metatarsal and the first of the philanges are articulated, or the chart may be so arranged that the length of the foot may be indicated at the end of the great toe, and furthermore the indication may read in characters that denote one or two sizes larger or longer than the actual measurement of the foot.

While I have herein shown a single embodiment of my invention for the purpose of a clear disclosure it will be manifest that considerable variations may be made from the disclosed apparatus without departing from the spirit and scope of the appended claims.

Having described my invention what I claim as new and desire to secure by Letters Patent is:

1. A chart device for outlining the characteristics of the human foot comprising means for clamping and holding the heel or oscalcis of the foot in natural position; a plate to receive the weight imposed upon the foot and extending in front of the clamping means; a line on the plate passing through the center of the heel and of the great toe of a normal foot when said foot is in position on the device, and a chart for location on said plate having a longitudinal line for alignment with said line on the plate and means to hold the said chart in place on the plate.

2. A chart device for outlining the characteristics of the human foot comprising a plate having a median fixed line extending longitudinally thereof; clamping members for the heel of the foot, one on each side of the said line; means to move said members towards and from said line to clamp the heel and a removable chart having a line for alignment with the line on the plate of the device and means to hold the chart in place.

3. A foot measuring device comprising in combination, a plate having a median line thereon, a clamping member having a jaw disposed on each side of said line, said jaws having opposite arcuate recesses therein to form the contour of a heel, flanges on said jaws, means for securing a chart in abutment with said flanges, and means for moving said jaws towards or away from each other.

4. In a device of the class described, a plate, members movable on said plate and having recesses therein of different contour to correspond to the shape of a heel, a yoke embracing said members, a pair of shafts rotatably locked at one end in each of said members and threadedly engaging said yoke and extending therethrough, gears on the other ends of said shafts, a drive shaft, and gears on said drive shaft engageable with said first-mentioned gears.

5. A foot measuring device comprising in combination, a plate, a pair of clamping members movable on said plate and complementarily recessed to outline a heel, outwardly extending flanges on said member, a U-shaped member embracing said clamping members, stud bolts engaging said clamping members and threadedly engaging said U-shaped member, gears on said stud bolts, a drive shaft, gears on said drive shaft engaging said first-mentioned gears, and means for removably retaining a chart in abutment with said flanges.

6. A foot measuring device comprising a plate having a median line thereon, clamping members on either side of said line and having complementary recesses therein of different configuration adapted to register, to conform to, and securely retain a heel in position over said line, flanges on said members, a yoke member secured to said plate and embracing said clamping members, shafts rotatably engaging said clamping members and threadedly engaging said yoke member, gears on said shafts, a drive shaft mounted on said yoke member, gears on said drive shaft engaging said first-mentioned gears, and a chart on said plate abutting said flanges whereon the anterior portion of a foot may be outlined.

In testimony whereof I have hereunto subscribed my name.

WILLIAM M. SCHOLL.